United States Patent [19]

Murschall et al.

[11] Patent Number: 5,366,796
[45] Date of Patent: Nov. 22, 1994

[54] SEALABLE, MATT, BIAXIALLY ORIENTED MULTILAYER POLYOLEFIN FILM

[75] Inventors: Ursula Murschall, Nierstein; Angela Speith, Wiesbaden; Gunter Schloegl, Kelkheim, all of Germany

[73] Assignee: Hoechst Aktiengesellschaft, Frankfurt am Main, Germany

[21] Appl. No.: 963,628

[22] Filed: Oct. 20, 1992

[30] Foreign Application Priority Data

Oct. 24, 1991 [DE] Germany ............... 4135096

[51] Int. Cl.$^5$ ............................................. B32B 7/02
[52] U.S. Cl. ................................. 428/216; 428/516; 428/910; 428/349
[58] Field of Search ............... 428/216, 516, 910, 349, 428/515

[56] References Cited

U.S. PATENT DOCUMENTS

| | | | |
|---|---|---|---|
| 4,211,811 | 7/1980 | Bordini et al. | 428/220 |
| 4,297,415 | 10/1981 | Ward et al. | 428/516 |
| 4,410,582 | 10/1983 | Tsunashima et al. | 428/212 |
| 4,419,411 | 12/1983 | Park | 428/516 |
| 4,522,887 | 6/1985 | Koebisu et al. | 428/461 |
| 4,578,316 | 3/1986 | Clauson et al. | 428/516 |
| 4,666,778 | 5/1987 | Hwo | 428/412 |
| 4,855,187 | 8/1989 | Osgood, Jr. et al. | 428/516 |

FOREIGN PATENT DOCUMENTS

| | | |
|---|---|---|
| 0008623 | 3/1980 | European Pat. Off. |
| 0236945 | 9/1987 | European Pat. Off. |
| 0367613 | 5/1990 | European Pat. Off. |
| 1145199 | 3/1969 | United Kingdom |
| 2201407 | 9/1988 | United Kingdom |

*Primary Examiner*—Edith Buffalow
*Attorney, Agent, or Firm*—Foley & Lardner

[57] ABSTRACT

A biaxially oriented multilayer film composed of a base layer and at least one outer layer. The base layer contains a propylene polymer. The outer layer contains two components A and B, the component A being composed of a high-density polyethylene (HDPE) and the component B of a copolymer of ethylene and propylene or ethylene and butylene or propylene and butylene or ethylene and another α-olefin containing 5 to 10 carbon atoms or propylene and another α-olefin containing 5 to 10 carbon atoms or of a terpolymer of ethylene and propylene and butylene or ethylene and propylene and another α-olefin containing 5 to 10 carbon atoms or of a mixture of two or more of the copolymers and/or terpolymers mentioned. The film has excellent properties and is useful, for example, as a packaging film, in a laminate, and as a backing film.

27 Claims, No Drawings

SEALABLE, MATT, BIAXIALLY ORIENTED MULTILAYER POLYOLEFIN FILM

BACKGROUND OF THE INVENTION

1. Field of the Invention

The invention relates to a biaxially oriented multilayer film comprising a base layer and at least one outer layer. The base layer essentially comprises a propylene polymer; the outer layer essentially contains high-density polyethylene (HDPE) and copolymers and/or terpolymers of α-olefins containing 2 to 10 carbon atoms, optionally mixed with polypropylene. Outer layers disposed on either side may be the same or different. At least one outer layer of the multilayer film is sealable and matt.

The invention also relates to a method of producing a multilayer film and to its use.

2. Description of Related Art

DE-A-16 94 694 discloses sealable multilayer films which are composed of biaxially oriented polypropylene films and contain at least one heat-sealable layer composed of an ethylene/propylene copolymer. These films have good heat sealability, but they are clear and not scratch-resistant to the desired extent. In addition they have inadequate processing properties on fast-running packaging machines.

EP-A-0 008 904 discloses a biaxially oriented three-layer polyolefin film which is sealable on both sides and in which the base layer is formed from propylene polymers and the two sealing layers are formed from sealable olefin polymers. This polyolefin film has good heat sealability, but it is transparent and in particular only slightly scratch-resistant and not printable. In addition, it also leaves something to be desired in relation to its surface slip properties with regard to fast-running packaging machines.

U.S. Pat. No. 4,419,411 discloses a biaxially oriented polyolefin film which is sealable on both sides and contains three layers. In these films, both sealing layers incorporate polysiloxane and silicon dioxide as an additive combination. The base layer is essentially composed of polypropylene and contains a small amount of monocarboxylic acid amide, which partially migrates from the base layer into the two sealing layers. The multilayer polyolefin film described is said to have a particularly low coefficient of friction. This film is particularly subject to the disadvantage that it is not printable.

U.S. Pat. No. 4,578,316 discloses a biaxially oriented multilayer polyolefin film whose base layer is composed of a propylene homopolymer and whose outer layer is composed of a blend of polypropylene and MDPE and/or HDPE. This polyolefin film has a low coefficient of friction combined with a readily wettable surface; however, this film, too, has an excellent optical clarity.

WO 89/10839 describes multilayer polyolefin films whose base layer is composed of a propylene polymer and whose outer layers are composed either of HDPE and an ethylene/propylene copolymer or a polypropylene, the film being stretched under special temperature conditions. It has, in particular, a low coefficient of friction and a good wettability, but at the same time it also has a high gloss and low haze.

SUMMARY OF THE INVENTION

An object of the present invention is to avoid the disadvantages of the films described in the art. In particular, it is intended to provide a multilayer film which is remarkable for a high haze, a minimum gloss and a uniform mattness of at least one surface. In addition, the film outer layer, which is essential to the invention, has good sealing properties, in particular a large sealing range and a good heat sealability.

Depending on its application purpose, it is further an object of the invention to provide a film having a rough and/or printable surface, a high surface tension which is stable over long storage times and/or a low friction and, consequently, has good running properties on fast-running packaging machines.

Another object of the present invention is to provide a process for producing such a film and to provide various uses for such a film.

In accomplishing the foregoing objectives, there has been provided, in accordance with one aspect of the present invention, a biaxially oriented multilayer film comprising (a) a base layer containing a propylene polymer, (b) at least one outer layer containing two components (A) and (B), wherein component (A) is composed of a high density polyethylene (HDPE), and wherein component (B) is composed of at least one copolymer selected from the group consisting of:
ethylene and propylene,
ethylene and butylene,
propylene and butylene,
ethylene and an α-olefin containing 5 to 10 carbons, and
propylene and an α-olefin containing 5 to 10 carbon atoms, c) wherein the film has a haze value, measured by ASTM D 1003, of greater than 40, and d) wherein the film has a gloss, measured by ASTM D 523-78, of less than 35 at an angle of 85°.

In accordance with another aspect of the present invention, there has been provided a method of making a multilayer film as described above comprising the steps of:

a) coextruding the melts corresponding to the individual layers of the film through a flat-film die, b) taking off the coextruded film on a take-off roll, the take-off roll preferably having a temperature of 60° to 110° C., so as to consolidate the film, c) biaxially stretching the consolidated film, preferably at a longitudinal stretching ratio of 4:1 to 7:1 and a transverse stretching ratio 8:1 to 10:1, d) heat setting the biaxially stretched film, and e) optionally corona or flame treating the outer surface of the film.

Further objects, features, and advantages of the present invention will become apparent from the detailed description of preferred embodiments that follows.

DETAILED DESCRIPTION OF THE PREFERRED EMBODIMENTS

The films according to the invention have the desired optical appearance, i.e., a matt outer surface and an outer surface of a high haze combined with the desired sealing properties. In the context of the present invention, matt surfaces are understood as meaning, in particular, those having gloss values (measured in accordance with ASTM D 523-78) of less than 35 at an angle of 85° and haze values of greater than 40, measured in accordance with ASTM D 1003.

The base layer of the multilayer film according to the invention contains a propylene polymer and, optionally, admixed additives in active amounts in each case. The base layer generally comprises at least 70% by weight of the propylene polymer, preferably at least 90% by weight, and even more preferably 95 to 99% by weight of the propylene polymer. Any known propylene containing polymer can be used as well as any known additives. The propylene polymer preferably contains at least 50%, more preferably at least 90% by weight of propylene. The propylene polymer preferably has a melting point of 140° C. or higher, more preferably 150° to 170° C. Isotactic polypropylene having an n-heptane-soluble component of 6% by weight and less, based on the isotactic polypropylene, copolymers of ethylene and propylene having an ethylene content of 5% by weight or less, copolymers of propylene with ($C_4$–$C_8$)-$\alpha$-olefins having an $\alpha$-olefin content of 5% by weight or less are preferred propylene polymers for the base layer. Isotactic homopolymers of propylene being particularly preferred. The propylene polymer of the base layer generally has a melt flow index of 0.5 g/10 min to 10 g/10 min, preferably 1.5 g/10 min to 4 g/10 min, at 230° C. with a loading of 21.6N (DIN 53 735). The specified percentages by weight used above are based on the respective copolymer.

The multilayer film comprises at least one outer layer according to the invention. In a preferred embodiment, the multilayer film is three-layered and provided with outer layers on both surfaces of the base layer. Optionally suitable interlayers may be situated, in addition, between the base layer and the outer layer(s).

The outer layer(s) disposed on the surface(s) of the base or interlayer contain two components A and B and, optionally, admixed therewith any known additives in their usual amounts. Outer layers disposed on either side may be the same or different in their structure and their composition.

To achieve the desired optical properties of the film, the two components A and B are used as a blend. Surprisingly, this results in a film having high haze and low gloss. In the context of the present invention, a blend is an alloy-like combination of individual components which can no longer be decomposed mechanically into the original constituents. A blend has properties like those of a homogeneous substance and can accordingly be characterized by suitable parameters.

The statement ". . . mixture of two of more" in the claims does not relate to a specific form of mixing, i.e., the blend component B may for its part be either a mechanical mixture or even itself a blend.

The component A of the blend is composed of a high-density polyethylene (HDPE) preferably having a melting range of 130° to 145° C. and a crystallinity of 40 to 80%. High-density polyethylenes have a density in the range from 0.910 to 0.970 g/cm$^3$. The viscosity number (measured in accordance with DIN 53 728, Part 4, in 0.1%-strength decahydronaphthalene solution at 135° C.) is generally in a range from 200 to 600 cm$^3$/g, preferably in the range from 200 to 400 cm$^3$/g. The viscosity average of the molecular mass $M_n$ (calculated in accordance with $VZ=0.046 \cdot M_n^{0.73}$) is generally between 90,000 and 400,000 g/mol, preferably between 95,000 and 250,000 g/mol. The melt flow index is preferably in the range from 0.5 to 1.5/10 min (DIN 53 735 at 190° C.). The HDPE may be a homopolymer or copolymer with one or more suitable comononers. Preferably, the HDPEs used are not pure homopolymers, but have been copolymerized with a small proportion of butylene. This proportion of copolymer, such as butylene, is generally not more than 4% by weight, and is generally markedly lower than 4%.

The component B according to the present invention comprises
 a copolymer of
  ethylene and propylene or
  ethylene and butylene or
  propylene and butylene or
  ethylene and another $\alpha$-olefin containing 5 to 10 carbon atoms or
  propylene and another $\alpha$-olefin containing 5 to 10 carbon atoms or
 a terpolymer of
  ethylene and propylene and butylene or
  ethylene and propylene and another $\alpha$-olefin containing 5 to 10 carbon atoms or
 a mixture of two or more of the copolymers and/or terpolymers mentioned.

Particularly preferably, the component B is composed of
 a copolymer of
  ethylene and propylene or
  ethylene and 1-butylene or
  propylene and 1-butylene or
 a terpolymer of
  ethylene and propylene and 1-butylene or of
 a mixture of two or more of the particularly preferred copolymers and/or terpolymers mentioned, in which connection, in particular,
 random ethylene/propylene copolymers having
  an ethylene content of 2 to 10% by weight, preferably 5 to 8% by weight, or
 random propylene/1-butylene copolymers having
  a butylene content of 4 to 25% by weight, preferably 10 to 20% by weight,
 based in all cases on the total weight of the copolymer, or
 random ethylene/propylene/1-butylene terpolymers having
  an ethylene content of 1 to 10% by weight, preferably 2 to 6% by weight, and
  a 1-butylene content of 3 to 20 % by weight, preferably 8 to 10% by weight,
 based on the total weight of the terpolymer, or a mixture of an ethylene/propylene/1-butylene terpolymer and
 a propylene/1-butylene copolymer
  having an ethylene content of 0.1 to 7% by weight and a propylene content of 50 to 90% by weight and a 1-butylene content of 10 to 40% by weight, based on the total weight of the polymer mixture are particularly preferred.

Optionally, the outer layer mixture may contain a small amount of propylene homopolymer in addition to the components described above. In this connection, the proportion here should generally not exceed 40% by weight of the propylene homopolymer of the outer layer. The content of homopolymer should be chosen in such a way that the properties essential to the invention, including sealability and matt surface are not impaired, and, for this purpose, it is preferably in the range from 1 to 30% by weight. If present, the propylene homopolymer is contained as a further blend component in the blend of the components A and B.

The mixing ratio (ratio by weight) of the two components A and B in the blend can be varied depending on intended use of the film so as to obtain the desired properties and generally is between A:B=20:80 and A:B=80:20, preferably between A:B=40:60 and A:B=60:40 and is, in particular, preferably A:B=45:55.

The blend of the components A and B generally has a melt flow index (DIN 53 735 at 230° C. with a loading of 21.6N) of 1.5 g/10 min to 12 g/10 min, preferably of 2.5 g/10 min to 6 g/10 min, the melt flow index of the blend generally being higher than that of the propylene polymer of the base layer.

The melting range of the blend is generally between 110° and 140° C., preferably between 125° and 135° C.

The reduced specific viscosity (viscosity number) of the blend measured in line with DIN 53 728, Part 4, is generally between 1.5 and 3.5 dl/g, preferably between 2.0 and 3.0 dl/g. An example of such a blend is obtainable under the trade name DUL 3636 ® from the Schulman GmbH company, Kerpen, Germany.

The cover layers generally comprise at least 70% by weight of said blend, preferably at least 90% by weight, even more preferably 95 to 99% by weight.

The thickness of the outer layer(s) can be varied depending on intended use of the film and is generally greater than 0.4 $\mu$m and is preferably in the range from 1.0 to 3 $\mu$m, it being possible for the outer layers on either side to be of the same or different thickness.

The total thickness of the multilayer polyolefin film according to the invention may vary within wide limits and depends on the intended use. It is generally 5 to 70 $\mu$m, and preferably 10 to 50 $\mu$m, the base layer preferably forming about 50 to 80% of the total film thickness.

To improve the adhesion properties of the outer layer(s), the surface of the film may be corona- or flame-treated, the respective treatment of one surface possibly being sufficient.

In order to improve certain properties of the polyolefin film according to the invention still further, both the base layer and the outer layer(s) may contain further additives. Such additives include any known in the art and are preferably antistatics, anti-blocking agents, lubricants, stabilizers and/or neutralizing agents, in an active amount in each case. All the amounts specified in the following explanation in % by weight (wt. %) relate in all cases to the layer or layers to which the additive is a mixed.

Any known antistatic agents can be used. Preferred antistatics are alkali alkane sulfonates, polyether-modified, i.e., ethoxylated and/or propoxylated, polydiorganosiloxanes (polydialkylsiloxanes, polyalkylphenylsiloxanes and the like) and/or the essentially straight-chain and saturated aliphatic tertiary amines having an aliphatic radical containing 10 to 20 carbon atoms which are substituted with $\omega$-hydroxy-($C_1$–$C_4$) alkyl groups. N,N-bis(2-hydroxyethyl)alkylamines containing 10 to 20 carbon atoms, preferably 12 to 18 carbon atoms, in the alkyl radical are particularly suitable. The active amount of antistatic is generally in the range from 0.05 to 0.3 wt. %.

Any known lubricants can be used. Suitable lubricants include higher aliphatic acid amides, higher aliphatic acid esters, waxes and metal soaps, and also polydimethylsiloxanes. The active amount of lubricant is generally in the range of 0.1 to 3 wt. %. Particularly suitable is the addition of higher aliphatic acid amides in the range from 0.10 to 0.35 wt. % in the base layer and/or the outer layers. A particularly suitable aliphatic acid amide is erucamide. The addition of polydimethylsiloxanes, in particular polydimethylsiloxanes having a viscosity of 10,000 to 1,000,000 $mm^2$/s, is preferred in the range from 0.3 to 2.0 wt. %. Particularly beneficial is the addition of polydimethylsiloxanes in one or both outer layers.

As stabilizers, the standard compounds with stabilizing action for ethylene, propylene and other $\alpha$-olefin polymers are used. The amount added thereof is generally between 0.05 and 2 wt. %. Particularly suitable are phenolic stabilizers, alkali-metal/alkaline-earth stearates and/or alkali-metal/alkaline-earth carbonates.

Phenolic stabilizers are preferred in an amount of 0.1 to 0.6 wt. %, in particular 0.15 to 0.3 wt. %, and having a molecular mass of more than 500 g/mol. Pentaerythrityl tetrakis-3-(3,5-di-tert-butyl-4-hydroxyphenyl)propionate or 1,3,5-trimethyl-2,4,6-tris(3,5-di-tert-butyl-4-hydroxybenzyl)benzene are particularly advantageous.

As neutralizing agents any known agents can be used. Alkaline-earth stearates and carbonates, in particular calcium stearate and/or calcium carbonate having a mean particle size of less than 0.1 mm, preferably 0.03 to 0.07 mm, an absolute particle size of less than 10 $\mu$m, preferably less than 5 $\mu$m, and a specific surface of at least 40 $m^2$/g, are preferred generally in an added amount of 0.01 to 0.05 wt. %.

Suitable anti-blocking agents include all those known in the art and especially inorganic additives such as silicon dioxide, calcium carbonate, magnesium silicate, aluminum silicate, calcium phosphate and the like and/or incompatible organic polymers such as polyamides, polyesters, polycarbonates and the like, benzoguanamine/formaldehyde polymers, silicon dioxide and calcium carbonate being preferred. The active amount of anti-blocking agent is generally in the range from 0.1 to 2 wt. %, preferably 0.1 to 0.5 wt. %. The mean particle size is generally between 1 and 6 $\mu$m, in particular 2 and 5 $\mu$m, particles having a spherical shape, such as those described in EP-A-0 236 945 and DE-A-38 01 535, being particularly suitable. Preferably, the anti-blocking agents are added to the outer layers.

The invention also relates to a process for producing the multilayer film. Any known process can be used, with the coextrusion process being preferred. The process comprises coextruding the individual layers of the film of the corresponding melts through a flat-film die, heating the film so obtained for the purpose of consolidation on one or more roll(s) which is/are preferably heated, taking it off, then stretching (orienting) the film biaxially, heat setting the biaxially stretched film and, optionally, corona-treating the surface layer intended for corona treatment.

The biaxial stretching (orienting) can be carried out simultaneously or consecutively, the consecutive biaxial stretching, in which stretching is first carried out longitudinally (in the machine direction) and then transversely (perpendicularly to the machine direction), being preferred.

As is standard in the coextrusion method, the polymer or the polymer mixture or the blend of the individual layers is first compressed and liquefied in an extruder, it being possible for the optionally admixed additives to be contained in the polymer already. The melts are then simultaneously pressed through a flat-film die (sheet die) and the extruded multilayer film is taken off on one or more, preferably heated, take-off rolls, in which process it cools and consolidates.

The film so obtained is then stretched longitudinally and transversely with respect to the extrusion direction, which results in an orientation of the molecule chains.

In the longitudinal direction, 4:1 to 7:1 stretching is preferably carried out and in the transverse direction, 8:1 to 10:1 stretching is preferably carried out. The longitudinal stretching will expediently be carried out with the aid of two rolls which fast-run differently in accordance with the desired stretching ratio and the transverse stretching with the aid of a suitable tenter frame.

The biaxial stretching of the film is followed by its heat setting (heat treatment), the film being preferably held at a temperature of 150° to 180° C. for 0.5 to 10 s. The film is then wound up in the usual manner using a winding device.

It has proven particularly beneficial to maintain the take-off roll or rolls which also cool and consolidate the extruded film at a temperature of 60° to 110° C., which is higher than is conventionally used, by means of a heating and cooling circuit.

In addition, the biaxial stretching is advantageously carried out at an increased film temperature, the longitudinal stretching preferably at 130° to 150° C. and the transverse stretching preferably at 165° to 190° C.

Optionally, as mentioned above, one or both surface(s) of the film may be corona- or flame-treated by one of the known methods after the biaxial stretching.

The corona treatment comprises passing the film between two conductor elements which serve as electrodes, a voltage, usually an alternating voltage (generally about 10,000 V and 10,000 Hz), being applied between the electrodes which is so high that spray or corona discharges are able to take place. The spray or corona discharge ionizes the air above the film surface and the latter reacts with the molecules of the film surface producing polar occlusions in the essentially nonpolar polymer matrix. The treatment intensities are within the standard scope, 38 to 45 mN/m being preferred.

In the flame treatment, the film is generally passed over a cooling roll above which a gas burner is disposed. The film is pressed fully against the cooling roll by a nip roll. The gas escaping from the burner is ignited and forms a flame about 5 to 10 mm in size. In this process, the oxidizing part of the flame impinges on the surface of the film and ensures an increase in the surface energy of the film.

Surprisingly, the multilayer film according to the invention is remarkable for its outstanding sealing properties combined with a minimum gloss and a maximum haze. Thus, in the determination of the properties of various embodiments of the multilayer film of the invention, a sealing seam strength of greater than 1.5N/15 mm was found by the T-Peel method, the sealing temperature extending over a range from 90° to 160° C. The haze value of the multilayer film, measured in accordance with ASTM D 1003, is without exception above 40, generally between 40 and 85, preferably between >60 and 80, and the gloss of the multilayer film, measured in accordance with ASTM D 523-78 is less than 35, generally less than 30, preferably between 25 and 10, at an angle of, for example, 85°.

The mean peak-to-valley heights, measured in accordance with DIN 4768, are over 1.0 $\mu$m, generally between 1 and 6 $\mu$m, preferably between 2.5 and 4.5 $\mu$m.

In addition to their desired sealing seam strength, the multilayer film according to the invention has an outstanding printability, which can be improved by a flame or corona treatment of the outer layer, the good sealing seam strength mentioned not being impaired, surprisingly, by this treatment.

Furthermore, a high mean peak-to-valley height of the outer layer was found, accompanied at the same time by a relatively low coefficient of friction for the given peak-to-valley height. As a result of this the film is outstandingly capable of being used even on fast-running packaging machines.

In addition, measurements of the surface tension showed that the film according to the invention has a high surface tension, which only decreases insignificantly even after a storage time of several months.

To summarize, it can be stated that the multilayer film according to the invention is remarkable for a multiplicity of advantageous properties, in particular for
 a very low gloss,
 a matt surface,
 a high haze,
 a high mean surface peak-to-valley height,
 a rather low coefficient of friction,
 a good short-term and long-term printability,
 a high surface tension,
 a good long-term stability of the surface tension and
 an excellent sealing weld strength which is not impaired even by a corona treatment.

As a result of this surprising multiplicity of balanced properties, a film is provided, according to the invention, which is outstandingly suitable for various application purposes, in particular as a packaging film on fast-running packaging machines, as effective matt cladding film for advertising purposes or as a matt cigarette wrapping film.

In addition, the film is useful as a backing film for an adhesive or partial adhesive layer, such as adhesive tape because the inventive film is stable over a long time and has a high surface tension or as a backing film for aqueous barrier coating systems, for example, based on aqueous dispersions of polyvinylidene chloride or ethylene vinyl alcohol copolymers. It can be printed on with aqueous printing inks for various purposes and it has an excellent short-term and long-term printability. Because of its good immediate and long-term coatability, the film is also suitable for the production of laminates with paper, cardboard, metals, metallized plastic films and plastic films.

The invention is now explained in still greater detail by reference to illustrative examples, without being limited thereby.

EXAMPLE 1

A three-layer film 1 mm thick in total having an XZX layer structure, i.e., the base layer Z is surrounded by two identical outer layers X, is extruded by the coextrusion method from a sheet die at an extrusion temperature of 260° C.

The base layer comprises a polypropylene homopolymer having an n-heptane-soluble component of 4.5 wt. % and a melting point of 165° C. The melt flow index of the polypropylene homopolymer is 3.2 g/10 min at 230° C. with a loading of 21.6N (DIN 53 735).

The two outer layers X comprise a blend of two components A and B in a weight ratio of A:B=50:50, the blend having a melt flow index of 3.8 g/10 min. The component A is composed of an HDPE having a melting point of 134° C. The component B is composed of a random ethylene/propylene copolymer having an ethylene content of 5%, based on the weight of the copolymer.

All the layers contain 0.12 wt. % of pentaerythrityl tetrakis-4-(3,5-di-tert-butyl-4-hydroxyphenyl)propionate (Irganox 1010®) for the purpose of stabilization and 0.06 wt. % of calcium stearate as neutralizing agent. The base layer furthermore contains 0.15 wt. % of N,N-bis(2-hydroxyethyl) ($C_{10}$–$C_{20}$)alkylamine (Armostat 300®) as antistatic.

The extruded three-layer film is taken off, via the appropriate method steps after the coextrusion, by means of a first take-off roll and a further set of three rolls and cooled, then longitudinally stretched, transversely stretched, heat set and corona-treated, the following conditions being chosen in particular:

| Extrusion: | Extrusion temperature 260° C. |
| --- | --- |
| | Temperature of the first take-off roll 90° C. |
| | Temperature of the set of three rolls 50° C. |
| Longitudinal stretching: | Stretching roll T = 137° C. |
| | Cooling roll T = 90° C. |
| | Longitudinal stretching by a factor of 5 |
| Transverse stretching: | Heating zone T = 185° C. |
| | Stretching zone T = 180° C. |
| | Transverse stretching by a factor of 10 |
| Heat setting: | Temperature T = 155° C. |
| Corona treatment: | Voltage: 10,000 V |
| | Frequency: 10,000 Hz |

The multilayer film produced in this way has a matt surface on either side and has a surface tension of 40 to 41 mN/m immediately after production.

The film is approximately 21.5 μm thick, the base layer being 19 μm thick and each outer layer 1.25 μm thick.

EXAMPLE 2

Example 1 is repeated. The blend of the outer layers is composed of 40 pbw of a terpolymer of ethylene, propylene and 1-butylene units having an ethylene content of 1.4 wt. % and a 1-butylene content of 8.4 wt. %, based on the terpolymer, and 60 wt. % of HDPE having a melting point of 134° C., the melt flow index of the blend being 4.0 g/10 min.

EXAMPLE 3

Example 1 is repeated. The blend of the outer layers is composed of HDPE and a polymer mixture, the blend having a melt flow index of 4.1 g/10 min.

The polymer mixture is composed of an ethylene-/propylene/1-butylene terpolymer and a propylene/1-butylene copolymer corresponding to a content of 0.7 wt. % of ethylene, 81.3 wt. % of propylene and 18 wt. % of butylene, based on the polymer mixture.

The HDPE has a melting point of 134° C. The blend contains the components HDPE (A) and polymer mixture (B) in a ratio of A:B=45:55.

EXAMPLE 4

Example 1 is repeated, however, the film is stretched by a factor of 10 in the transverse direction at 185° C.

COMPARISON EXAMPLE 1

Example 1 is repeated. The temperature of the takeoff roll is 30° C. as in the standard biaxially oriented polypropylene (BOPP) multilayer film production.

COMPARISON EXAMPLE 2

Example 1 is repeated. The thickness of the outer layers is 0.4 μm.

COMPARISON EXAMPLE 3

Example 1 is repeated. The blend of the outer layers is composed of 10 wt. % of HDPE and 90 wt. % of random ethylene/propylene copolymer having an ethylene content of 5%, based on the copolymer. The melt flow index of the blend is 4.1 g/10 min (DIN 53 735).

COMPARISON EXAMPLE 4

Example 1 is repeated. The temperature of the longitudinal stretching is 128° C.

COMPARISON EXAMPLE 5

Example 1 is repeated. The temperature in the longitudinal stretching is 162° C.

COMPARISON EXAMPLE 6

Example 1 of WO 89/10839 is reworked. Both surfaces are surface-treated as in Example 1.

The following methods of measurement were used to characterize the raw materials and the films:

Melt Flow Index

The melt flow index was measured in line with DIN 53 735 at a loading of 21.6N and at 230° C. or 190° C. for HDPE.

Melting Point

DSC measurement, maximum of melting curve, heating rate 20° C./min.

Haze

The haze of the film was measured in accordance with ASTM D 1003-52.

Gloss

The gloss was determined in accordance with DIN 67 530. The reflector value was measured as an optical characteristic value for the surface of a film. The angle of incidence was set at 60° or 85° in accordance with the standards ASTM D 523-78 and ISO 2813. A light ray is incident on the flat test surface at the set angle of incidence and is reflected or scattered by the latter. The light rays incident on the photoelectronic receiver are indicated as a proportional electrical variable. The measured value is dimensionless and must be stated along with the angle of incidence.

Sealing Seam Strength

For the determination, two 15 mm wide strips of film were placed one on top of the other and sealed at 130° C. with a sealing time of 0.5 s and a sealing pressure of 10 mm² (apparatus: Brugger type NDS, sealing jaw heated on one side). The sealing seam strength was determined by the T-Peel method.

Mean Peak-to-Valley Height

The mean peak-to-valley type was determined in accordance with DIN 4768.

Friction

The friction was determined in accordance with DIN 53 375.

Surface Tension

The surface tension was determined by means of the so-called ink method (DIN 53 364).

Printability

The corona-treated films were printed 14 days after their production (short-term assessment) and 6 months after their production (long-term assessment). The ink adhesion was assessed by means of an adhesive tape test.

If it was not possible to peel off any ink by means of adhesive tape, the ink adhesion was assessed as good (++), if individual, small flakes were peeled off, the ink adhesion was assessed as moderate (±), and as poor (−) in the case of marked ink peeling.

Viscosity Number

The viscosity number or reduced specific viscosity was determined in accordance with DIN 53 728, Part 4.

Density

The density was determined at 23° C. in accordance with ISO 1183 or DIN 53 479.

The properties of the polyolefin films of the examples and comparison examples are summarized in the table below.

As the results show, the polyolefin films according to the invention are superior to those of the comparative examples. Only the films according to the invention have the required high film haze, the low surface gloss accompanied simultaneously by good sealing seam strength and are consequently remarkable for general-purpose use possibilities for various application purposes.

TABLE

| Examples and comparison examples | Gloss (ASTM D 523-78) Measurement angle | | Haze (ASTM D 1003) | Mean peak-to-valley height (c.o. 0.25 mm) | Coefficient of friction | Surface tension after 6 months of storage | Visual assessment of mattness | Sealing seam strength (130° C.; 0.5 g, 10 N/mm²) |
|---|---|---|---|---|---|---|---|---|
| | 60° | 85° | % | μm | | mN/m | | N/15 mm |
| B1 | 12 | 20 | 75 | 3.4 | 0.40 | 38 | ++ | 1.8 |
| B2 | 10 | 18 | 80 | 2.8 | 0.40 | 37 | ++ | 2.1 |
| B3 | 14 | 25 | 72 | 3.2 | 0.50 | 38 | ++ | 2.0 |
| B4 | 13 | 21 | 76 | 3.5 | 0.40 | 38 | ++ | 1.7 |
| Comparison examples | | | | | | | | |
| VB1 | It is not possible to produce a BOPP film because of extreme contact defects (take-off roll temperatures too low) | | | | | | | |
| VB2 | 26 | 50 | 55 | 0.9 | 0.35 | 36 | − | 1.0 |
| VB3 | 50 | 110 | 10 | 0.5 | 0.40 | 33 | − | 1.5 |
| VB4 | 20 | 42 | 60 | 0.9 | 0.40 | 37 | − | 1.6 |
| VB5 | 25 | 55 | 50 | 0.8 | 0.35 | 38 | − | 1.6 |
| VB6 | 110 | * | 1.7 | 0.4 | 0.32 | 38 | − | <0.8 |

(*) Too glossy to be measured at an angle of 85°
B Example
VB Comparison example

What is claimed is:

1. A biaxially oriented multilayer film comprising
   (a) a base layer containing a propylene polymer,
   (b) at least one outer layer containing a blend of two components (A) and (B),
   wherein component (A) is composed of a high density polyethylene (HDPE), and
   wherein component (B) is composed of at least one copolymer selected from the group consisting of:
   ethylene and propylene,
   ethylene and butylene, propylene and butylene,
   ethylene and an α-olefin containing 5 to 10 carbons, and
   propylene and an α-olefin containing 5 to 10 carbon atoms,
   c) wherein the film has a haze value, measured by ASTM D 1003, of greater than 40, and
   d) wherein the film has a gloss, measured by ASTM D 523-78, of less than 35 at an angle of 85°.

2. A multilayer film as claimed in claim 1, wherein said copolymer is selected from the group consisting of a terpolymer of ethylene, propylene, and butylene, and a terpolymer of ethylene, propylene, and an α-olefin containing five to ten carbon atoms.

3. A multilayer film as claimed in claim 1, wherein the propylene polymer of the base layer contains at least 90% by weight of propylene.

4. A multilayer film as claimed in claim 1, wherein the propylene polymer of the base layer is an isotactic propylene homopolymer having an n-heptane-soluble component of about 6% by weight or less.

5. A multilayer film as claimed in claim 1, wherein the component B is selected from the group consisting of
   a two-component copolymer of
   ethylene and propylene,
   ethylene and 1-butylene,
   propylene and 1-butylene,
   a terpolymer of
   ethylene and propylene and 1-butylene, and
   mixtures of two or more of the above polymers.

6. A multilayer film as claimed in claim 1, wherein said polyethylene has a melting point in the range from about 130° to 145° C. and a viscosity number of from about 200 to 600 cm³/g.

7. A multilayer film as claimed in claim 1, wherein the component B contains at least one member selected from the group consisting of:
   random ethylene/propylene copolymers having
   an ethylene content of about 2 to 10% by weight of the copolymer;
   random propylene/1-butylene copolymers having
   a 1-butylene content of about 4 to 25% by weight of the copolymer;
   random ethylene/propylene/1-butylene terpolymers having
   an ethylene content of about 1 to 10% by weight of the terpolymer, and
   a 1-butylene content of about 3 to 20% by weight of the terpolymer; and
   a mixture of an ethylene/propylene/1-butylene terpolymer and a propylene/1-butylene copolymer, the mixture
   having an ethylene content of about 0.1 to 7% by weight,
   and a propylene content of about 50 to 90% by weight,
   and a 1-butylene content of about 10 to 40% by weight,
   based on the total weight of the polymer mixture.

8. A multilayer film as claimed in claim 1, wherein the mixing ratio by weight of the two components A and B in the blend is between about A:B=20:80 and about A:B=80:20.

9. A multilayer film as claimed in claim 8, wherein said mixing ratio is between about A:B=40:60 and about A:B=60:40.

10. A multilayer film as claimed in claim 1, wherein the outer layer further contains a propylene homopolymer.

11. A multilayer film as claimed in claim 10, wherein the outer layer contains from about 1 to 30% by weight of said propylene homopolymer.

12. A multilayer film as claimed in claim 1, wherein the melt flow index measured by DIN 53 735 of the propylene polymer of the base layer is between about 0.5 g/10 min and 10 g/10 min.

13. A multilayer film as claimed in claim 1, wherein the thickness of the outer layer is between about 0.4 and 3.0 $\mu$m.

14. A multilayer film as claimed in claim 1, wherein the total thickness of the multilayer film is between about 5 and 70 $\mu$m.

15. A multilayer film as claimed in claim 1, wherein at least one of the base layer and the outer layer contains at least one additive selected from the group consisting of an antistatic agent, an anti-blocking agent, a lubricant, a stabilizer, and a neutralizing agent.

16. A multilayer film as claimed in claim 1, wherein the blend has a melt flow index of from about 1.5 to 12 g/10 min as measured by DIN 53 735 at 230° C.

17. A multilayer film as claimed in claim 1, which contains two of said outer layers, one on either side of said base layer.

18. A multilayer film as claimed in claim 1, wherein said outer layer is corona or flame treated so as to improve the adhesion properties of the outer layer.

19. A packaging comprising a multilayer film as claimed in claim 1.

20. A multilayer film as claimed in claim 1, wherein the outer layer is coated with an adhesive layer.

21. A multilayer film as claimed in claim 1, wherein the outer layer is coated with an aqueous barrier coating.

22. A multilayer film as claimed in claim 1, wherein the outer layer is printed.

23. A laminate comprising a multilayer film as claimed in claim 1.

24. A laminate according to claim 22, additionally comprising at least one layer of paper, cardboard, metal, metallized plastic film, or a plastic film other than said multilayer film.

25. A multilayer film as claimed in claim 1, wherein the outer layer is sealable and has a sealing seam strength of greater than 1.5N/15 mm.

26. A multilayer film as claimed in claim 1, wherein the mean peak-to-valley heights of the outer layer are over 1.0 micrometers.

27. A multilayer film as claimed in claim 1, wherein the mean peak-to-valley heights of the outer layer are between 2.5 and 4.5 micrometers, the haze value of the film is greater than 60, and the gloss at 85° C. of the film is less than 25.

* * * * *